United States Patent [19]
Müller et al.

[11] Patent Number: 6,102,606
[45] Date of Patent: Aug. 15, 2000

[54] UNTHREADED ATTACHMENT OF A JOINT EYE TO A PISTON ROD

[75] Inventors: Horst Müller, Münnerstadt; Karl-Heinz Hofmann, Werneck, both of Germany

[73] Assignee: Mannesmann Sachs AG, Schweinfurt, Germany

[21] Appl. No.: 09/116,633

[22] Filed: Jul. 16, 1998

[30] Foreign Application Priority Data

Jul. 21, 1997 [DE] Germany .............................. 197 31 137

[51] Int. Cl.⁷ ...................................................... B23K 9/24
[52] U.S. Cl. .................... 403/270; 403/375; 188/322.17; 228/212; 228/44.3; 219/119
[58] Field of Search ..................................... 403/270, 271, 403/272, 375, 328; 188/322.16, 322.17; 228/212, 44.3; 219/117.1, 119

[56] References Cited

U.S. PATENT DOCUMENTS

| | | | |
|---|---|---|---|
| 1,578,019 | 3/1926 | Ellis et al. | 219/119 X |
| 3,503,474 | 3/1970 | Raab | 188/321.11 |
| 3,655,017 | 4/1972 | Lorcher et al. | 188/321.11 |
| 3,816,701 | 6/1974 | Stormer | 219/152 |
| 5,896,960 | 4/1999 | Ananthanarayanan | 188/322.17 X |

FOREIGN PATENT DOCUMENTS

| | | |
|---|---|---|
| 1 630 449 | 6/1971 | Germany . |
| 41 05 555 | 8/1992 | Germany . |
| 195 08 851 | 9/1996 | Germany . |
| 196 34 177 | 1/1998 | Germany . |
| 56 141 438 | 11/1981 | Japan . |
| 58 196 343 | 11/1983 | Japan . |
| 60 191 676 | 9/1985 | Japan . |
| 2 276 930 | 10/1994 | United Kingdom . |

*Primary Examiner*—Terry Lee Melius
*Assistant Examiner*—David E. Bochna
*Attorney, Agent, or Firm*—Cohen, Pontani, Lieberman & Pavane

[57] ABSTRACT

An unthreaded attachment of a joint eye to the piston rod of a vibration damper or spring strut, particularly by resistance welding. The piston rod and joint eye are held by one clamp electrode each, and the axial force created during welding is absorbed by a stop. A positive-locking connection is arranged between the piston rod and the clamp electrode to achieve axial fixing, so that joint eye can be attached in any installation state of the damper, even when the vibration damper is already installed.

4 Claims, 1 Drawing Sheet

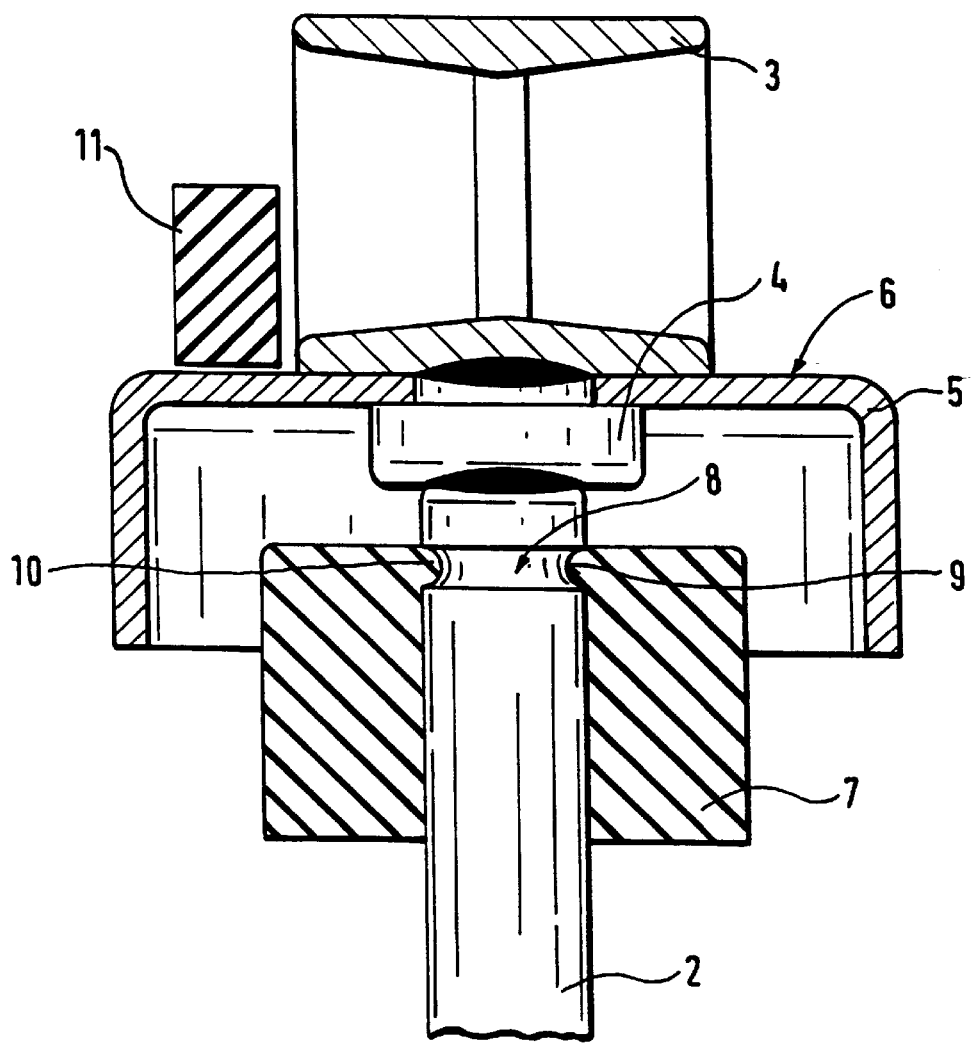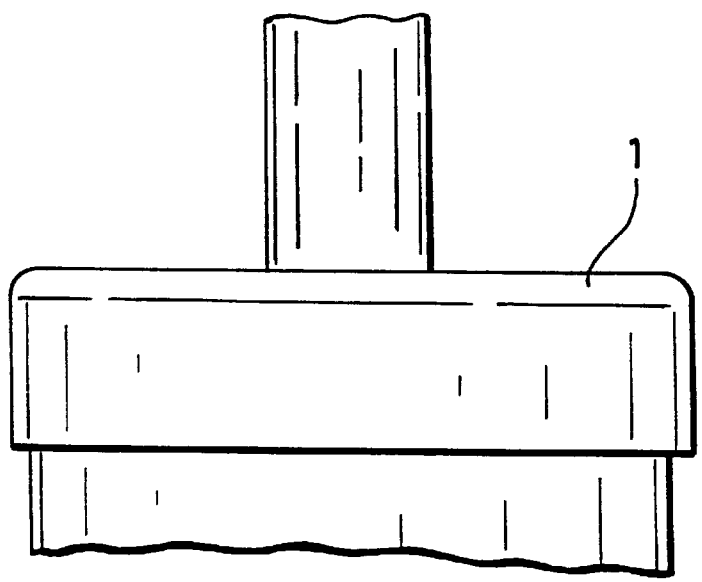

UNTHREADED ATTACHMENT OF A JOINT EYE TO A PISTON ROD

BACKGROUND OF THE INVENTION

1. Field of the Invention

The invention relates to an unthreaded attachment of a joint eye to the piston rod of a vibration damper or spring strut.

2. Discussion of the Prior Art

An unthreaded attachment of the joint eye to the piston rod by means of resistance welding is known, for example, from German reference DE PS 1 630 449. To ensure that any weld spatters that occur during resistance welding are kept away from the joint eye, cap and piston rod, there is an approximately shell-shaped part that rests tightly, on one side, on the joint eye and, on the other side, on the cap, forming a non-detachable part of the metal connection. The electrode that acts on the piston rod during the welding process needs only to establish good electric contact, while the axial force applied during welding is usually absorbed by a stop, against which the free front surface of the piston rod rests. The joint eye can thus be welded to a piston rod not yet installed in the vibration damper.

Further, German reference DE 195 08 851 A1 discloses a connection of the piston rod to a cap and a joint eye, wherein the cap has a central push-in that is adjusted to the diameter of the piston rod. The central push-in can be pressed into the piston rod to a stop and is welded to the piston rod.

In the known designs, attachment of the joint eye or joint eye and cap to the piston rod is carried out before the piston rod has been assembled, i.e., in the non-installed state.

SUMMARY OF THE INVENTION

The object of the present invention is to provide an unthreaded connection of a joint eye to the piston rod that can be established simply and economically in any installation state.

Pursuant to this object, and others which will become apparent hereafter, one aspect of the present inventions resides in the joint eye being attached to the piston rod, in particular, after the piston rod has been installed in the vibration damper or spring strut, whereby, for the purpose of axially fixing the piston rod, a preferably positive-locking connection is arranged between the clamp electrode and the piston rod. As a result, very good electric contact is established between the clamp electrode and the piston rod. At the same time, the piston rod, the surface of which is smooth and usually oily, cannot be moved axially by the axial force applied during resistance welding. The piston rod can therefore be connected to the joint eye in any installation state.

Axial fixing can also be obtained by means of a good friction-locking connection between the piston rod and the clamp electrode. However, a positive-locking connection is preferable, because a positive-locking connection will not malfunction, i.e., will not allow the piston rod to move axially. In one embodiment of the invention, the positive-locking connection between the clamp electrode and the piston rod is established by means of at least one depression located in the cylindrical wall of the piston rod in the area of the weld, into which depression a corresponding projection of the clamp electrode engages for the purpose of axial fixing. In still another embodiment of the invention, the depression in the piston rod is a ring groove.

According to the invention, a highly advantageous unthreaded attachment of the joint eye to the piston rod is created by the joint eye, with a cap and a spacing piece extending into the cap, being connected, before being welded to the piston rod, to a component that, as the invention indicates, is equipped with corrosion protection. Suitable corrosion protection includes the generally known coatings, e.g., zinc, chromium and standard compounds thereof, as well as nitrided layers and nickel coats.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The single FIGURE is a cross-section of an attachment pursuant to the present invention.

DETAILED DESCRIPTION OF THE PREFERRED EMBODIMENTS

The drawing shows part of the housing of a vibration damper 1, from which a piston rod 2 extends. A joint eye 3, a cap 5, and a spacing piece 4 covered by the cap 5, are preferably joined by a welded connection to form a component 6, which can be equipped, prior to its unthreaded attachment to the piston rod 2, with corrosion protection consisting of a standard coating. To connect the component 6 to the piston rod 2, one clamp electrode (shown schematically with 11) acts upon the component 6, while the other clamp electrode 7 has a projection 10 that can be embodied in the shape of a circular ring and thus engage into a depression 8, which consists of a ring groove 9. In this way, the clamp electrode 7 establishes a positive-locking connection with the piston rod 2, so that axial force exerted by the clamp electrodes on the weld prevents the piston rod 2 from slipping during the welding process.

In the illustrated embodiment, the weld is located inside the cap 5 between the component 6 and the piston rod 2, and is thus covered by the cap 5. In the case of the vibration damper 1, the cylindrical outer surface of the cap 5 is usually used for the attachment of a protective tube. In the case of a spring strut, the cap 5 is usually used for the gas-tight connection of a tube provided for unilateral acceptance of a spring bellows. In both cases, the weld is located between the piston rod 2 and the component 6 in such a manner as to be corrosion-protected and not visible from the outside, so that no subsequent corrosion protection at the weld is needed.

The invention is not limited by the embodiments described above which are presented as examples only but can be modified in various ways within the scope of protection defined by the appended patent claims.

We claim:

1. An unthreaded attachment of a joint eye to a piston rod of a vibration damper, comprising:

a joint eye;

a piston rod welded to the joint eye;

a clamp electrode arranged to hold the piston rod;

a further clamp electrode arranged to hold the joint eye, whereby an axial force acts between the joint eye and the piston rod during welding; and positive-locking connection means for positively connecting the clamp electrode to the piston rod so as to axially fix the piston rod, the positive-locking connection means between the clamp electrode and the piston rod including at least one depression located in a cylindrical wall of the piston rod in an area of the weld, the clamp electrode having a corresponding projection that engages in the depression to axially fix the piston rod.

2. An unthreaded attachment of a joint eye to a piston rod as defined in claim 1, wherein the depression in the piston rod is a ring groove.

3. An unthreaded attachment of a joint eye to a piston rod as defined in claim 1, and further comprising a cap and a spacing piece that extends into the cap, the joint eye, the cap and the spacing piece being connected together to form a single component.

4. An unthreaded attachment of a joint eye to a piston rod as defined in claim 3, wherein the component is provided with corrosion protection.

* * * * *